June 28, 1949.  H. J. NICHOLS  2,474,635
VARIABLE PITCH PROPELLER
Filed Aug. 18, 1943  3 Sheets-Sheet 1
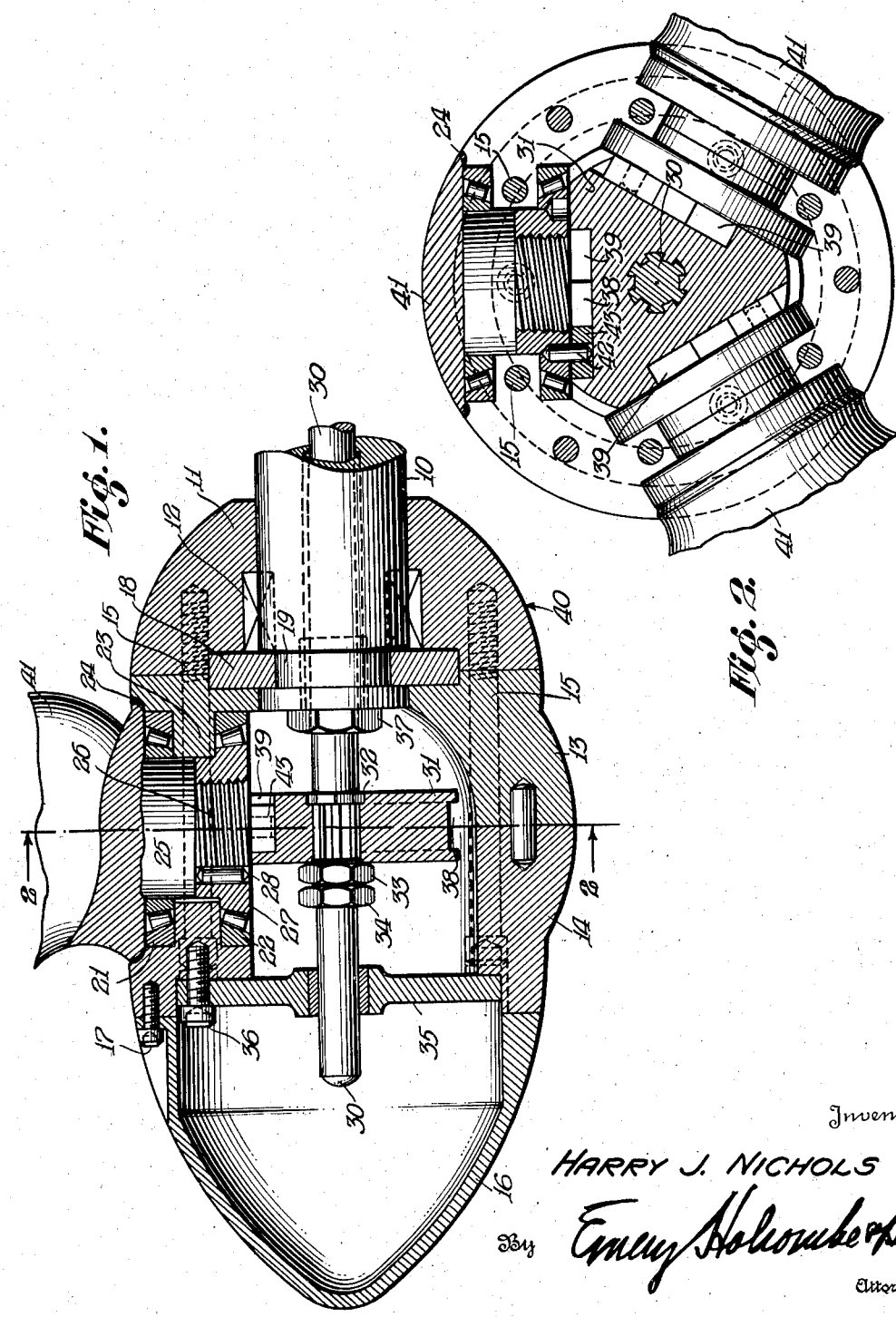
Inventor
HARRY J. NICHOLS
By Emery Holcombe
Attorney June 28, 1949. H. J. NICHOLS 2,474,635
VARIABLE PITCH PROPELLER
Filed Aug. 18, 1943 3 Sheets-Sheet 2
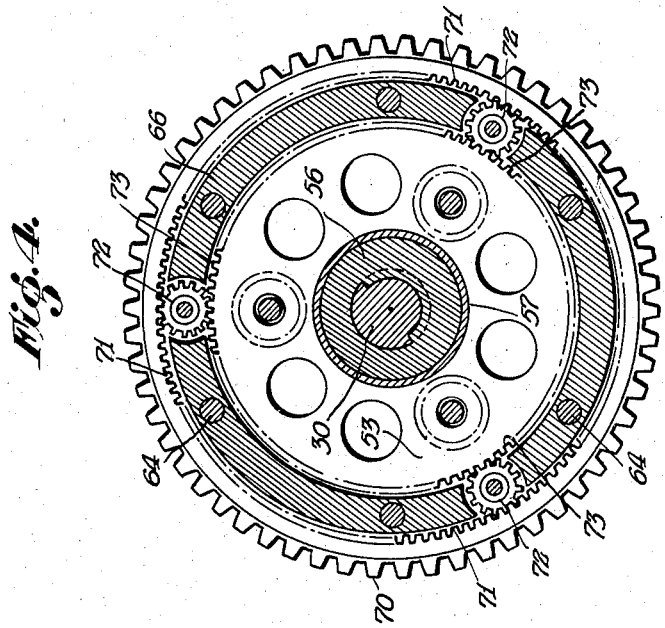
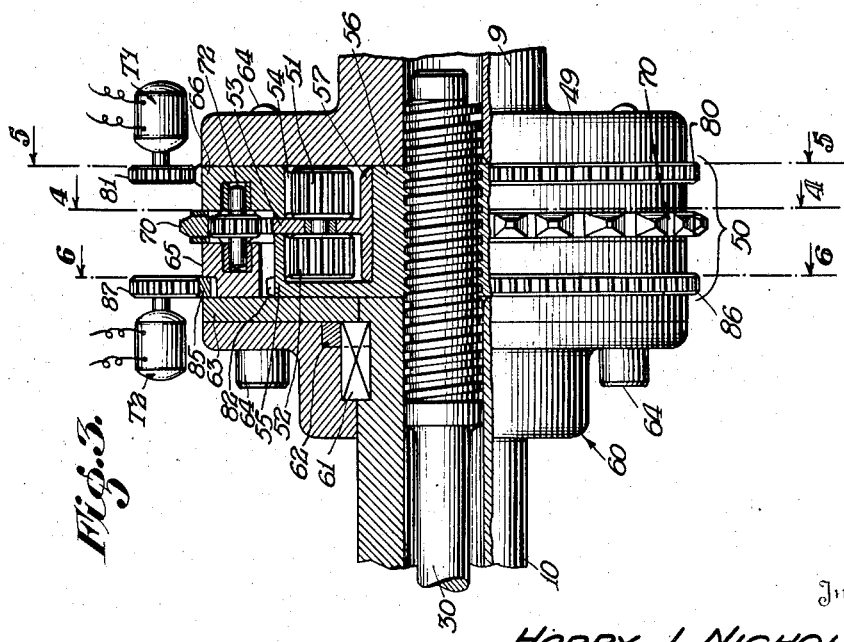
Inventor
HARRY J. NICHOLS
By Emery Holcomb & Bleu
Attorney June 28, 1949.  H. J. NICHOLS  2,474,635
VARIABLE PITCH PROPELLER
Filed Aug. 18, 1943  3 Sheets-Sheet 3
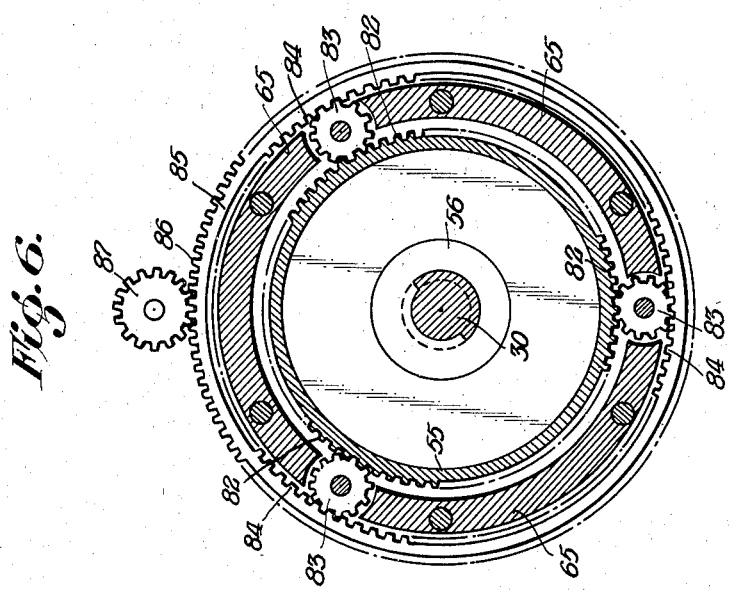
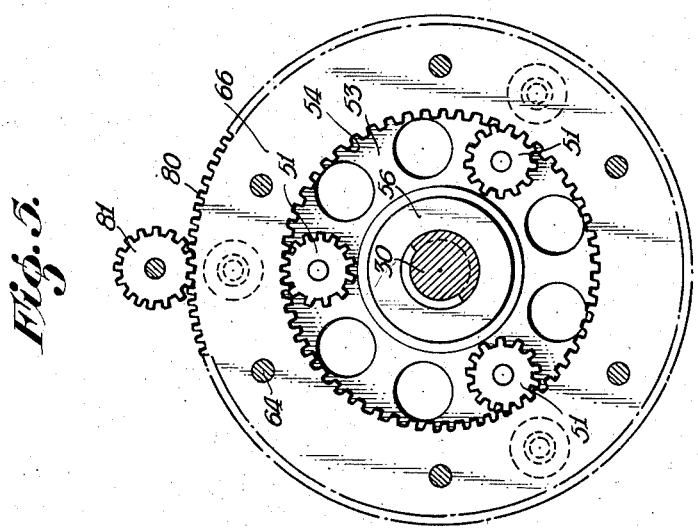
Inventor
HARRY J. NICHOLS.

Patented June 28, 1949

2,474,635

UNITED STATES PATENT OFFICE 2,474,635

VARIABLE PITCH PROPELLER

Harry J. Nichols, New York, N. Y.

Application August 18, 1943, Serial No. 499,134

8 Claims. (Cl. 170—160.35)

1

This invention relates to variable pitch hydraulic propellers, especially for marine vessels and hydraulic turbines, and it has for its principal object the provision of a propeller of the character described in which the pitch of the blades may be varied accurately while the propeller is in rotation under load and in which the blades will be automatically locked against rotary displacement at all times.

A principal object is to provide an exceptionally simple, strong, and easily accessible blade actuating mechanism housed in the propeller hub, and a remotely situated primary actuating mechanism housed in a special flange coupling near the prime mover where it is easily motivated and controlled and is readily accessible for lubrication, inspection, and other purposes.

Another object is to replace the torsion or quill shaft heretofore used for varying the pitch of propeller blades by a relatively rigid push-pull rod which greatly increases the rigidity of the pitch varying system and which avoids any possibility of vibration or flutter of the blades under load due to excessive elasticity of the system.

Another object is to provide a novel and compact shaft coupling unit for variable pitch propellers having housed therein torque multiplying mechanism of exceptional compactness relative to its power, thereby to avoid the necessity of inserting special shaft sections and multiple flange couplings in the propeller shafting to accommodate such mechanism, as in the prior art.

A further object is to provide a construction in which the gears of the primary actuating mechanism are normally relieved of any strain due to the blade reaction, thus reducing wear on the gear teeth and enabling a relatively light gear mechanism to be employed.

A further object is to provide a pitch varying system of adequate angular range, including reversing of the blades, which is capable of changing the pitch in micrometric increments, yet also is capable of changing the pitch at a rapid rate for maneuvering and emergency purposes.

With these and other objects in view, as well as other advantages incident to the improved construction, the invention consists in the various parts and combinations thereof set forth and claimed, with the understanding that the several necessary elements constituting the same may be varied in proportions and arrangement without departing from the nature and scope of the invention as defined in the appended claims.

2

To enable others skilled in the art to comprehend the several underlying features of this invention, that they may embody the same by suitable modifications in structure and relation to meet the various practical applications contemplated by the invention, drawings showing a preferred embodiment of the invention form part of this disclosure, and in such drawings like characters of reference denote corresponding parts in the several views in which, Fig. 1 is a side elevation in partial axial section of a marine variable pitch propeller and drive shaft therefor embodying certain features of the invention.

Fig. 2 is a transverse sectional view taken substantially on lines 2—2 of Fig. 1.

Fig. 3 is a side elevation in partial axial section of the gear mechanism and flange coupling forming part of the invention.

Figs. 4, 5, and 6 are transverse sectional views taken substantially on lines 4—4, 5—5, and 6—6 respectively of Fig. 3.

Considering the invention as a whole, and referring particularly to Figs. 1 and 3, a variable pitch marine propeller system embodying the invention is shown as comprising a hollow main drive shaft 9 having a collar or annular flange 49 upset or otherwise provided thereon at its driving end, and driving a tubular propeller shaft 10, having a demountable flange 60, by means of a novel coupling unit 50 which comprises a special flange coupling in which is housed a gear-driven screw jack. A propeller hub 40 having rotatable blades 41 is mounted on the outboard end of propeller shaft 10, the latter housing connecting rod 30 which operatively connects the screw jack mechanism with the blade actuating mechanism within propeller hub 40.

The coupling unit 50, the actuating mechanism of which is preferably driven by a reversible motor and a transmission chain (not shown), is preferably mounted inside the vessel at an accessible location. The entire pitch changing mechanism rotates bodily with the shafts at shaft speed, the gears and other parts of the mechanism being normally at rest relative to each other. When the blade pitch is to be changed, the reversible motor drives the sprocket gear 70 of the coupling unit 50 in one direction or the other relative to the shafts, thereby producing a change of pitch as described hereafter in detail. Small electrical transmitters T1 and T2, which are driven by the coupling unit, provide remote indication of the pitch angle in connection with other accessories not shown.

Referring now to the drawings in detail, and particularly to Fig. 1, the propeller of the invention is shown as comprising a sectional hub 40 consisting of a forward portion 11 which is fixed to the tubular main propeller shaft 10 by keys 12, an intermediate portion 13, and an after portion 14, the latter portions being secured to the forward portion 11 by longitudinally extending bolts 15; and a hollow cap portion 16 of streamline form which is secured to the after portion 14 by screws 17. This hub structure is maintained against axial displacement by means of a split collar 18, engageable with a circumferential groove 19 formed in the propeller shaft 10 and clamped between the forward and intermediate portions 11 and 13 of the hub.

The central portions of the hub are provided with a plurality of radially extending bores formed with inner and outer seats for roller bearing units 21 and 22 respectively, and an annular intermediate shoulder 23. The propeller includes a plurality of blades 41, each having a root portion 25 journalled in the bearings 21 and 22, and formed with a reduced threaded end 26 on which is screwed a nut 27 which latter also forms the inner race of bearing 22. The nut 27 is secured against loosening after assembly by dowel pin 28. A packing washer 24 of any preferred type is assembled between the blade 41 and the seat in the hub to prevent leakage of lubricant and entrance of water into the hub.

The blades 41 may be rotated in the hub to vary their pitch from the full forward pitch to a negative pitch (reverse position) even while the propeller is being rotated under load, by means of a connecting rod 30, which extends coaxially through the drive shaft 10 and is slidable therein under the action of gear actuated screw jack means Fig. 3 carried by the shafts for reciprocating rod 30. This rod is provided with a cross head 31 (triangular in shape for a three-bladed propeller as shown in Fig. 2) splined on rod 30 and secured against axial displacement by split collar 32 seated in a groove on rod 30 and by nuts 33 and 34. The after end of rod 30 is journalled in disc 35 which is secured to the hub by bolts 36. A gland nut 37 serves as a bearing for rod 30 in shaft 10, and also seals the propeller shaft against entrance of water.

Referring to Figs. 1 and 2, the cross-head 31 has channels 38 formed in the edges thereof, and in these channels work slipper blocks 43 which are slidable therein. Openings 39 cut in the forward walls of channels 38 at the inner end permit assembly of the slipper blocks in the channels at a non-operative point. Each slipper block 43 has a central bore adapted to receive a crank pin 42 securely mounted on bearing nut 27 which is fixed on the root of a blade.

The cavity of hub 40 is provided with a supply of lubricant which provides lubrication for the working parts of the propeller mechanism.

Upon reciprocation of connecting rod 30, the slipper blocks 43 are traversed back and forth and slightly sidewise and, in so doing, rotate blades 41 by means of crank pins 42, varying the pitch of the blades in unison.

The construction described provides a strong, durable, positive, and efficient blade twisting mechanism well adapted to the rigid requirements of marine use.

Referring now to Fig. 3 which shows the details of the mechanism for reciprocating the connecting rod 30, this mechanism comprises a unitary assembly 50 housed in a special flange coupling connecting the propeller shaft 10 to the main drive shaft 9, as for example the drive shaft of a prime mover. The main shaft 9 is shown as being provided with a conventional upset flange 49, while the propeller shaft 10 is preferably provided with a keyed, demountable flange 60, constructed in the same general manner as the hub coupling, thereby to enable the propeller shaft 10 to be withdrawn rearwardly through the shaft bearings (not shown). The demountable flange structure is fixed to the propeller shaft 10 by keys 61 and is maintained against axial displacement by means of a split collar 62 engageable with a circumferential groove formed in propeller shaft 10. Collar 62 is clamped between flange 60 and ring 63. The flanges 49 to 60 are strongly clamped to the coupling members 65 and 66 by through bolts 64 in well known manner. The inner end of rod 30 is provided with strong threads and is mounted so to be slidable coaxially in propeller shaft 10 and drive shaft 9.

The torque amplifier mechanism for increasing the torque of the driving motor to provide a powerful torque for turning nut 56 of the jack screw mechanism includes planetary gearing of differential type comprising a plurality of paired planetary pinions 51, 52 carried by and journalled in planetary pinion carrier wheel 53, and meshing with stationary internal gear 54 cut in the inner rim of stationary ring 66 (see Fig. 5), which also forms a member of the flange coupling, and with driven internal gear 55, the hub 56 of the latter being mounted as a free nut on the threaded portion of rod 30. The hub 57 of wheel 53 is journalled on hub 56, and the rim of wheel 53 is provided with external spur gear teeth 73. (See Fig. 4.) The number of teeth in stationary gear 54 and driven gear 55 differ slightly, say by one tooth, these gears preferably being cut on the same pitch circle.

Wheel 53 is driven for the purpose of varying the blade pitch by transmission gearing comprising a plurality of stationary pinions 72 rotatably mounted in recesses in the flange coupling between portions 65 and 66 thereof; and a floating ring sprocket 70 having internal gear teeth 71 meshing with pinions 72 and external teeth 73. The ring sprocket gear 70 is adapted to be driven as required to change the pitch by an independent, reversible prime mover, preferably a reversible electric motor, by any suitable means, as for example by a transmission chain (not shown).

Referring to Figs. 1 and 6, for the purposes of providing remote indication of the pitch angle by electrical means, additional gearing is provided as follows: ring member 86, which forms part of the flange coupling, is provided with external gear teeth 80 adapted to mesh with spur gear 81 driving electrical transmitter T1, which latter is thereby driven at a speed proportional to the shaft speed at all times. Also, driven gear 55 is provided with external teeth 82 which mesh with a plurality of stationary pinions 83 rotatably mounted in recesses in member 65, which in turn mesh with the internal teeth 86 adapted to mesh with spur gear 87 driving electrical transmitter T2, which is thereby driven at a speed proportional to the speed of driven gear 55. The differential angle of the shaft 10 and the driven gear 55 thus reflects the pitch angle of the blades. The electrical pitch indicating system not being part of the present invention, reference is made to my co-pending application Serial No. 41,656, filed July 30, 1948, the same being a continuation-in-part application based on a now abandoned application Serial No. 433,991, filed March 9, 1942 for particulars of that system.

The operation of the blade pitch varying mechanism is as follows: normally, when the drive shafts are in rotation, the mechanism turns bodily with the shafts without relative motion of the parts, except that external gears 81 and 87 are uniformly driven as described above. It is to be noted that the teeth of the pinions 51 and 52 normally lock the teeth of internal gears 54 and 55 together, preventing relative rotation of those gears. In other words, the gear system is irreversible and self-locking. In order to change the blade angle, the floating ring gear 70 is driven or braked by its controlling motor (not shown and which normally is driven idly) to advance or retard the ring gear 70 relative to the shaft. By means of the transmission pinions 72, the carrier wheel 53 is thus caused to rotate relative to the shafts, and the planetary pinions 51, 52 to roll around in the internal gears 54 and 55. Assuming, for example, that the pinions have made one complete trip revolving around in the internal gears, then the gears 54 and 55 will have gained or lost one tooth pitch relative to each other, according to the direction of travel of the pinions. Assuming, for example, that gear 54 is provided with 100 teeth, and gear 55 with 99 teeth, then the relative gain or loss will be one tooth pitch per planetary revolution of the pinions or approximately 3.6°, thus providing a torque amplification of approximately 100$x$. Therefore, nut 56 will turn 3.6° on the screw of rod 30, forcing a slight translation of that rod, and a micrometric change of the angle of the blades. The mechanical advantage of the system will depend on several factors, including the pitch of the screw and the radius of the crank pin from the center of the root of the blade, but it is evident that the mechanism of the invention provides a very powerful and efficient means for varying the blade pitch under load.

Furthermore, due to the high efficiency of the gear system, a light, high-speed motor can be used to drive sprocket gear 70, hence rapid changes of blade pitch can be effected by speeding up the motor as desired.

It is to be noted that with the mechanism of the invention, the thrust of the blade reaction under load is transmitted by rod 30 to nut 56 which is closely and strongly held against translation. The mechanical elements involved are usually rigid and close coupled, hence there is no opportunity for destructive backlash and vibration to arise from the blade reaction. At the same time, the screw and nut arrangement relieves the gear system of load except during pitch changing operations. Consequently, relatively light gearing can be employed in the planetary and transmission gears. The pitch varying mechanism of the invention is therefore well adapted to propeller installations of great power, as for example, warships and hydraulic turbines.

It is also to be particularly noted that the construction of variable pitch propellers provided by the invention is readily adaptable to equipping existing vessels with such propellers without extensive alteration of conventional propulsion arrangements.

I claim:

1. In mechanical operating mechanism for a variable pitch propeller mounted on a hollow propeller shaft driven by a drive shaft, combined coupling and pitch varying means including a ring member and a flange associated with a drive shaft and a second ring member and a flange associated with the propeller shaft, a plurality of bolts clamping said rings and flanges together so as to transmit driving torque from shaft to shaft, and planetary differential gearing housed within said ring members and flanges including a stationary gear forming part of one of the aforesaid rings, a rotary wheel carrying a plurality of planetary pinions meshing with said stationary gear and driven by transmission gearing external thereto, and a driven gear meshing with said planetary pinions whose hub constitutes the rotary nut member of a screw jack pair for varying the pitch of said propeller.

2. In a variable pitch propeller actuating device for connecting a hollow drive shaft to a hollow propeller shaft including a mechanical coupling comprising flange members mounted on each shaft, ring members interposed between said flange members, a plurality of bolts clamping said flange members and said ring members together so as to transmit driving torque from the drive shaft to the propeller shaft, and planetary differential gearing housed within said mechanical coupling comprising a sprocket ring gear having external and internal teeth, a plurality of transmission pinions journalled in said ring members and meshing with the internal teeth of said sprocket gear, a wheel rotatable concentrically with the shafts carrying a plurality of planetary pinions journalled therein and having external teeth meshing with the aforesaid transmission pinions, a stationary internal gear mounted concentrically with the shaft and meshing with the aforesaid planetary pinions, a rotatable driven gear having internal teeth meshing with the aforesaid pinions and having a hub provided with a threaded bore, a threaded rod comprising a journal for said hub reciprocable within the hollows of the shafts, said hub and said rod forming a rotary nut-and-screw pair.

3. In variable pitch propellers in combination, a hollow drive shaft, a hollow propeller shaft having a partially threaded connecting rod extending coaxially therethrough, a mechanical coupling for said shafts including flange members mounted on each shaft, ring separating members interposed between said flange members, a plurality of bolts for clamping and coupling said flange members and said separating members together so as to transmit driving torque, and planetary differential gearing housed within said mechanical coupling comprising a stationary gear with internal teeth, a driven gear with internal teeth and a hub mounted on said threaded connecting rod as a rotary nut, an externally toothed wheel journalled on the hub of said driven gear and carrying a plurality of planetary compound pinions journalled therein and meshing with said stationary gear and said driven gear, and transmission gearing for driving said wheel comprising a sprocket ring gear having external teeth and internal teeth, and a plurality of stationary pinions journalled in said ring separating members and meshing with the internal teeth of the sprocket ring gear and with the external teeth of the planetary carrier wheel.

4. The combination of claim 3 in which the compound planetary pinions are equal, and the stationary gear and driven gear are of substantially equal pitch diameter but differ slightly in the number of teeth.

5. In a mechanical coupling device for connecting a tubular propeller shaft carrying means for varying the blade pitch to a drive shaft in axial alignment therewith, in combination, a hollow coupling structure with means for connecting said shafts in driving relation, pitch actuating mechanism housed in said coupling structure, driving means for said actuating mechanism, an external gear mounted concentrically rotatable on said structure and connected to be driven by said driving means, a second external gear mounted concentrically on said structure and connected to be driven thereby, and transmitter means connected to be driven differentially by said external gears, thereby to actuate remote pitch indicator means in correlation with the angular relations of said gears.

6. In pitch varying mechanism for a variable pitch marine propeller system including a hub having a plurality of axially rotatable blades mounted on a tubular propeller shaft, the combination of; means for rotating said blades axially in unison while in rotation including a connecting rod extending coaxially through said propeller shaft and operatively connected to rotate said blades upon axial translation; and mechanism for translating said rod axially comprising planetary differential gearing including a fixed gear and a driven gear mounted coaxially of and around said rod, a rotatable driving wheel mounted coaxially around said rod and carrying a plurality of planetary pinions meshing in common with said fixed gear and said driven gear, power transmission gearing operatively connected to drive said driving wheel, and a power screw-jack driven by said differential gearing in which the connecting rod constitutes the screw member and the driven gear of said differential gearing constitutes the nut member of said screw-jack.

7. In mechanical pitch actuating means for a variable pitch marine propeller including a hub and a plurality of axially rotatable blades mounted on a hollow propeller shaft, mechanism for rotating said blades axially while said propeller is in rotation under load comprising reciprocable means mounted in said hub for rotating said blades axially in unison, a connecting rod extending coaxially through said propeller shaft, and operatively connected to said reciprocable means, mechanism mounted to rotate with said shaft for reciprocating said connecting rod axially including a power screw-jack in which a portion of said rod constitutes the screw member of the screw-jack, planetary differential gearing mounted coaxially around said screw member in which the driven gear of said gearing constitutes the rotary nut member of the screw-jack, and power transmission gearing connected to drive said differential gearing.

8. In a mechanical operating device for a variable pitch marine propeller including a hollow coupling assembly for connecting a drive shaft in driving relation to the propeller shaft, mechanism carried by said coupling assembly for varying the blade pitch while the propeller is in rotation under load comprising, in combination, a power screw-jack including a rotary nut member and a translatable screw member mounted coaxially in said coupling assembly, torque transmission gearing including a rotatable torque transmitting member mounted concentrically on said coupling assembly and adapted to be driven by power means external to said coupling assembly, and means for greatly amplifying the torque transmitted by said transmission gearing thereby to rotate said nut member comprising a planetary differential gear train of high reduction ratio mounted coaxially on and around said screw-jack and operatively connected to drive said nut member.

HARRY J. NICHOLS.

REFERENCES CITED

The following references are of record in the file of this patent:

UNITED STATES PATENTS

| Number | Name | Date |
|---|---|---|
| 1,432,090 | Simpson | Oct. 17, 1922 |
| 1,510,086 | Englesson | Sept. 30, 1924 |
| 1,590,528 | Lansing | June 29, 1926 |
| 1,855,174 | Bakewell | Apr. 26, 1932 |
| 1,877,048 | Popp | Sept. 13, 1932 |
| 1,879,659 | Coolidge | Sept. 27, 1932 |
| 1,917,538 | Messing | July 11, 1933 |
| 1,947,653 | Moody | Feb. 20, 1934 |
| 2,020,366 | MacCallum | Nov. 12, 1935 |
| 2,124,078 | Palmer et al. | July 19, 1938 |
| 2,132,504 | Whilser | Oct. 11, 1938 |
| 2,236,841 | Waseige | Apr. 1, 1941 |
| 2,265,952 | Montgomery | Dec. 9, 1941 |
| 2,344,029 | Day | Mar. 14, 1944 |
| 2,370,167 | Hoover | Feb. 27, 1945 |

FOREIGN PATENTS

| Number | Country | Date |
|---|---|---|
| 3,154 | Great Britain | Feb. 20, 1891 |
| 345,374 | Italy | Dec. 30, 1936 |
| 350,257 | Italy | July 8, 1937 |
| 824,546 | France | Nov. 10, 1937 |
| 366,414 | Italy | Dec. 27, 1938 |
| 848,267 | France | Oct. 29, 1939 |

OTHER REFERENCES

Standell "Controllable Pitch Propellers" from American Society of Naval Engineers Journal, volume 52, 1940.